(12) United States Patent
Berthy

(10) Patent No.: US 7,359,436 B2
(45) Date of Patent: Apr. 15, 2008

(54) METHOD FOR AUTOMATIC DETECTION OF THE DATA RATE IN A NETWORK, PARTICULARLY A CAN BUS TYPE NETWORK, AND FOR CONFIGURATION TO THE DETECTED DATA RATE, CORRESPONDING DEVICE

(75) Inventor: Jean-Sebastien Berthy, Petit-Mars (FR)

(73) Assignee: Atmel Nantes SA, Nantes (FR)

( * ) Notice: Subject to any disclaimer, the term of this patent is extended or adjusted under 35 U.S.C. 154(b) by 647 days.

(21) Appl. No.: 10/940,050

(22) Filed: Sep. 13, 2004

(65) Prior Publication Data

US 2005/0094570 A1 May 5, 2005

(30) Foreign Application Priority Data

Sep. 17, 2003 (FR) .................................. 03 10941

(51) Int. Cl.
H04B 3/46 (2006.01)
(52) U.S. Cl. ...................................................... 375/225
(58) Field of Classification Search ................ 375/225, 375/259, 316; 713/503; 702/176; 370/232, 370/233, 234; 327/113
See application file for complete search history.

(56) References Cited

U.S. PATENT DOCUMENTS 6,049,888 A 4/2000 Chanoux

2003/0058894 A1 3/2003 Feuerstraeter et al.
2005/0141565 A1* 6/2005 Forest et al. ................. 370/503

FOREIGN PATENT DOCUMENTS

EP 1 187 373 A2 3/2002
EP 1 206 092 A2 5/2002

* cited by examiner

*Primary Examiner*—Sam K. Ahn
(74) *Attorney, Agent, or Firm*—Merchant & Gould P.C.

(57) ABSTRACT

A method for automatic detection of the network data rate and for configuration at the detected data rate by a device connected to the network. This method includes an initialisation phase and an interative processing phase. The initialisation phase includes the following steps: the device is put into listening mode, in which it can receive messages from the network but it cannot send messages on the network; the device is initialised with an initial data rate configuration; a first timeout is started. The iterative processing phase comprises the following steps for each iteration: if at least one data rate adaptation condition is satisfied, the iterative processing phase is interrupted, the current data rate configuration is validated and the device is put into normal mode; if at least one data rate non-adaptation condition is satisfied or if the first timeout elapses without a data rate adaptation condition or a data rate non-adaptation condition being satisfied, the first timeout is reinitialised and the current data rate configuration is replaced by a new data rate configuration obtained by using a mechanism for obtaining several possible data rate configurations without knowledge of a clock frequency $f_h$ of the device and without any assumption about the network data rate.

18 Claims, 2 Drawing Sheets

METHOD FOR AUTOMATIC DETECTION OF THE DATA RATE IN A NETWORK, PARTICULARLY A CAN BUS TYPE NETWORK, AND FOR CONFIGURATION TO THE DETECTED DATA RATE, CORRESPONDING DEVICE

The invention relates to the domain of communication networks.

More precisely, the invention relates to a method for automatic detection of the data rate in a network using a device connected to the network and for configuration of the device to the detected data rate. The invention also relates to the device implementing this method.

The invention is particularly but not exclusively applicable to the case in which the network is of the CAN bus type network.

As an illustration and for simplification purposes, we will now present the technique according to prior art and its disadvantages in the above mentioned case in which the network is of the CAN bus type network.

Remember that a CAN (Controller Area Network) bus is a serial bus that connects several devices called "control units" each comprising a CAN controller. This type of bus is used nowadays mainly in industry and in the automotive field.

Typically, two CAN buses are used in a car. One is called the high data rate CAN bus (up to 1 Mb/s) and is used to interconnect control units for the following elements or functions: dashboard, engine, braking (anti-locking), active suspension, transmission, etc. The other, called the low data rate CAN bus (up to 125 kb/s) is used to interconnect control units for the following elements or functions: dashboard, lighting, air conditioning, inflatable safety cushions, door locking, electrical windows, etc.

Each CAN bus uses a protocol with the same name (CAN protocol) that is a serial communication protocol that supports real time systems with a high level of reliability in a limited and severe environment such as a factory, a workshop, a car, etc. The CAN protocol covers two of the seven layers of the ISO's OSI open systems interconnection model, namely the physical layer (layer 1) and the data link layer (layer 2). Refer to ISO standard 11898, inserted here by reference, for further information about the CAN bus.

The data link layer of the CAN protocol is such that each control unit can send and receive data. Data are transferred on the bus in the form of asynchronous packets (also called frames or messages) with a defined format but a variable and limited length. As soon as the bus is free, any control unit connected to the bus can send a new packet. An interruption mechanism for the highest priority packets is provided together with a mechanism for arbitration of conflicts resulting from the simultaneous emission of several packets on the bus when it is free.

Traditionally, when it is required to connect a new control unit (in other words a new device including a CAN controller that executes an application (layer 7 of the OSI model)) to a CAN bus, the following procedure is used. The developer of the application executed by the CAN controller must know the clock frequency of the CAN controller (for example 12 MHz). The network data rate also has to be one of a limited number of values (usually three values), for example 100, 250 or 500 kb/s. For each of the three assumed values of the network data rate, he determines a data rate configuration for the CAN controller a priori using knowledge of the clock frequency of the CAN controller. He then develops the application such that during operation, the application loads a first data rate configuration associated with a first assumed value of the network data rate; if the application receives error messages, it loads a second data rate configuration associated with a second assumed value of the network data rate; and so on, so as to test the various predetermined data rate configurations (if necessary).

One disadvantage of the known technique mentioned above is that it cannot be used in situations in which clock frequency of the CAN controller is not known.

Another disadvantage of the known technique described above is that it will not work if none of the assumptions about the network data rate is correct.

Yet another disadvantage of the known technique mentioned above is that the CAN controller genuinely disturbs the CAN bus when several possible data rate configurations are tested in sequence. This can even cause ejection of the CAN controller from the CAN bus.

In particular, the purpose of the invention is to overcome these various disadvantages according to prior art.

More precisely, one of the purposes of this invention is to provide a method and a device for automatic detection of the network data rate and for configuration at the detected data rate, not requiring any knowledge of the clock frequency of the device or any assumptions about the network data rate.

Another purpose of the invention is to provide such a method and a device that do not disturb the network.

Another purpose of the invention is to provide such a method and a device that are easy and inexpensive to implement.

These various purposes and others that will appear later, are achieved according to the invention using a method for automatic detection of the network data rate and for configuration at the detected data rate by a device connected to the network, this method including:

an initialisation phase including the following steps:
  the device is put into listening mode, in which it can receive messages from the network but it cannot send messages on the network;
  the device is initialised with an initial data rate configuration;
  a first timeout is started;
an iterative processing phase, comprising the following steps for each iteration:
  if at least one data rate adaptation condition is satisfied, the iterative processing phase is interrupted, the current data rate configuration is validated and the device is put into normal mode;
  if at least one data rate non-adaptation condition is satisfied or if the first timeout elapses without a data rate adaptation condition or a data rate non-adaptation condition being satisfied, the first timeout is reinitialised and the current data rate configuration is replaced by a new data rate configuration obtained by using a mechanism for obtaining several possible data rate configurations without knowledge of a clock frequency $f_h$ of the device and without any assumption about the network data rate.

Therefore the general principle of the invention consists of using a listening mode in which the network is not disturbed, to test several data rate configurations obtained without knowing the clock frequency of the device and without any assumption about the network data rate.

Advantageously, the said at least one data rate non-adaptation condition is detection by the device of an error called a bit error on at least one bit of a message received by the device.

Advantageously, the said at least one data rate adaptation condition is acknowledgement of a received message by the device.

Preferably, the said mechanism can be used to obtain all possible data rate configurations of the device one after the other.

According to one advantageous characteristic, the initialisation phase also comprises a step to start a second timeout, and the iterative processing phase also comprises a step to interrupt the method for each iteration, if the second timeout expires without a current data rate configuration being validated.

In one advantageous embodiment of the invention, the network is a CAN bus and the device comprises a CAN controller that is an extension of a classical CAN controller so that the method according to the invention for automatic detection of the network data rate and for configuration to the detected data rate can be implemented.

Each of the bits included in a message has a nominal time, for example defined by the following parameters:
- a scalar BRP, such that $TQ=BRP/f_h$, where TQ is a time quantum and $f_h$ is the clock frequency of the device;
- the length $L_{PRS}$ of a propagation segment designed to compensate for the physical delay on the CAN bus, expressed as a number of time quanta TQ;
- the lengths $L_{PHS1}$ and $L_{PHS2}$ expressed as a number of time quanta TQ, of first and second phase segments used to position a sampling point.

In this case, the said mechanism advantageously determines values for the scalar BRP and the lengths $L_{PRS}$, $L_{PHS1}$ and $L_{PHS2}$, for each of the several possible data rate configurations, without knowing the clock frequency $f_h$ Of the device and without any assumption about the network data rate.

Advantageously, the said mechanism uses an increment loop of the length $L_{PHS2}$, itself included in an increment loop of the length $L_{PRS}$, itself included in an increment loop of the scalar BRP. The increment loops for lengths $L_{PRS}$, $L_{PHS1}$ and $L_{PHS2}$ are such that the lengths $L_{PRS}$, $L_{PHS1}$ and $L_{PHS2}$ are incremented uniformly.

The invention also relates to a device designed to be connected to a network, characterized in that it comprises means for automatic detection of the network data rate and for configuration to the detected data rate, these means comprising:
- initialisation means comprising:
  - means of changing over from a normal mode to a listening mode, in which the locking means of messages sent by the device to the network are activated, the device continuing to receive messages from the network;
  - means of initialising the device with an initial data rate configuration;
  - means of starting a first timeout;
- iterative processing means comprising the following means activated during each iteration:
  - the first means of detection that at least one data rate adaptation condition is satisfied, the following means being activated in case of positive detection by the first detection means: means of interrupting the iterative processing, means of validating the current data rate configuration and means of changing over from listening mode to normal mode;
  - second means of detection that at least one data rate non-adaptation condition is satisfied or that the first timeout has expired without a data rate adaptation or non-adaptation being satisfied, the following means being activated in the case of a positive detection by the second detection means: means of reinitialising the first timeout and means of replacing the current data rate configuration by a new data rate configuration obtained by using a mechanism for obtaining several possible data rate configurations without knowing a clock frequency $f_h$ of the device and without any assumption about the network data rate.

Advantageously, the said at least one data rate non-adaptation condition is when the device detects an error, called a bit error, on at least one bit of a message received by the device.

Advantageously, the said at least one data rate adaptation condition is when the device acknowledges a received message.

Preferably, the said mechanism can be used to obtain all possible data rate configurations of the device one after the other.

According to one advantageous characteristic, the initialisation means also include means of starting a second timeout. Moreover, the iterative processing means also comprise third detection means activated during each iteration to detect if the second timeout expires without a current data rate configuration having been validated, means of interrupting the method being activated if the third detection means make a positive detection.

In one advantageous embodiment of the invention, the network is a CAN bus and the device comprises a completed CAN controller itself comprising the said means for automatic detection of the network data rate and for configuration to the detected data rate.

Each of the bits included in a message may for example have a nominal time defined by the following parameters:
- a scalar BRP, such that $TQ=BRP/f_h$, where TQ is a time quantum and $f_h$ is the clock frequency of the device;
- the length $L_{PRS}$ expressed as a number of time quanta TQ, of a propagation segment designed to compensate for the physical delay on the CAN bus;
- the lengths $L_{PHS1}$ and $L_{PHS2}$ expressed as a number of time quanta TQ, of first and second phase segments used to position a sampling point.

In this case, the said mechanism advantageously determines values for the scalar BRP and the lengths $L_{PRS}$, $L_{PHS1}$ and $L_{PHS2}$, for each of the several possible data rate configurations, without knowing the clock frequency $f_h$ of the device and without any assumption about the network data rate.

Advantageously, the said mechanism uses an increment loop of the length $L_{PHS2}$, itself included in an increment loop of the length $L_{PRS}$, itself included in an increment loop of the scalar BRP. The increment loops of lengths $L_{RPS}$, $L_{PHS1}$ and $L_{PHS2}$ are such that the lengths $L_{PRS}$, $L_{PHS1}$ and $L_{PHS2}$ are incremented uniformly.

Advantageously, the means of changing over from normal mode to listening mode comprise means of generating a mode selection signal (Autobaud), equal to the value "0" or "1" depending on whether the device is to operate in normal mode or listening mode, respectively. Moreover, the completed CAN controller comprises a classical CAN controller modified so that it itself includes the said means for automatic detection of the network data rate and for configuration to the detected data rate, apart from the said means of locking the sent messages. Finally, the means of locking the sent messages include means of performing the "OR" logical function between the mode selection signal and the send signal of the classical CAN controller, the output signal from the means of performing the "OR" logical function being used as the send signal of the completed CAN controller.

Advantageously, the completed CAN controller also includes means of looping the output back onto the input of the classical CAN controller, comprising:

means of performing the "AND" logical function between the send signal of the classical CAN controller and the reception signal of the completed CAN controller;

multiplexing means receiving the output signal from the means of performing the "AND" logical function on a first input, and the reception signal of the completed CAN controller on the second input, the output signal from the multiplexing means including the reception signal of the classical CAN controller, the multiplexing means being controlled by the mode selection signal such that the first or second input is selected depending on whether the mode selection signal is equal to the value "1" or "0" respectively.

Other characteristics and advantages of the invention will become clearer after reading the following description of a preferred embodiment of the invention given for illustrative and non-limitative purposes, and the appended drawings, wherein.

Therefore, the invention relates to a method and a device for automatic detection of a network data rate and for configuration to the detected data rate.

In the remainder of the description, we will simply consider the case in which the network is a CAN bus. However, it is obvious that the invention is also applicable to other types of network.

Figure 1:
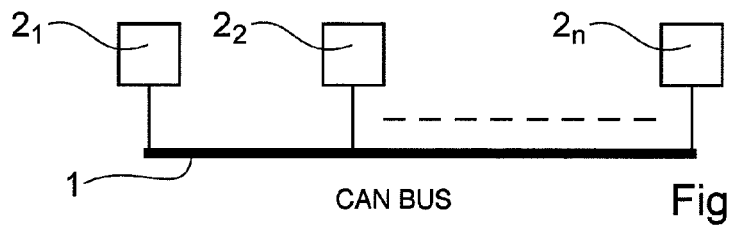
FIG. 1 shows a block diagram of a known system for interconnection of several devices through a CAN bus, system in which the method according to the invention for automatic detection and configuration of the data rate can be implemented.

As already mentioned above and illustrated in the block diagram in FIG. 1, a CAN bus 1 is a serial bus used to connect several devices $2_1$, $2_2$, . . . , $2_n$, called "control units", each including a CAN controller.

We will now briefly describe some essential characteristics of the CAN protocol, that is a serial communication protocol used by a CAN bus. For further information about this CAN protocol and the CAN bus, refer to the ISO standard 11898, inserted here by reference.

The CAN protocol makes a distinction between four types of CAN messages:

the data messages (Data Frame) in the standard format (11-bit identifier) or extended format (29-bit identifier);
data request messages (Remote Frame);
error messages (Error Frame);
network timeout messages (Overload Frame).

A standard CAN message comprises:
a frame start field;
an arbitration field that is composed of an identifier and a "Data request" bit used to distinguish a data message (Data Frame) from a request message (Remote Frame);
a check field that contains an "extended identifier" (IDE) bit and a number of data (DLC) indicating the number of data bytes that follow in the data field. In a request message, the number DLC is the requested number of data bytes;
a data field that can contain up to eight data bytes;
a check field (CRC) guaranteeing integrity of the message;
an acknowledgement field (ACK) composed of a marker and an acknowledgement delimiter. The bit in the acknowledgement marker is sent at a recessive level and is compressed to a dominant level by receiver devices that have received the data correctly at this time;
an end of message field (EOF);
an inter-message field (IFS) that is a minimum number of bits separating two consecutive messages.

The CAN protocol makes a distinction between five error types that are not mutually exclusive:
a bit error when the bit itself is in error;
a stuff bit error;
an acknowledgement error (ACK error);
a check error (CRC error);
a structure error.

A device connected to the CAN bus that detects an error condition is intended to signal the error by sending an error message. These special features mean that a device that is connected to a CAN bus must have a correct data rate configuration, otherwise it would endanger the CAN bus or it could be excluded from this CAN bus.

Figure 2:
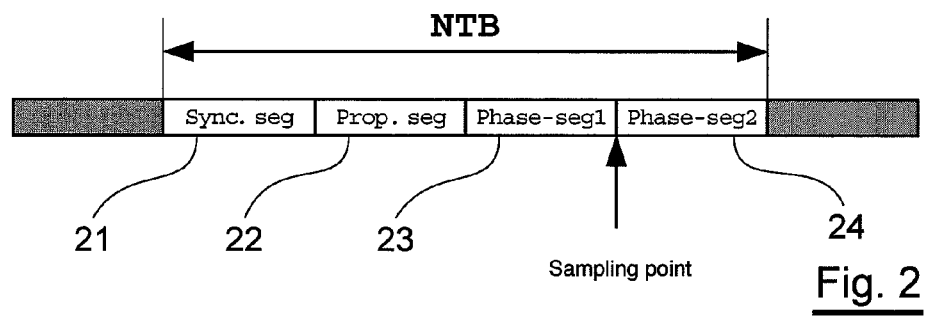
FIG. 2 illustrates the known structure of each bit included in a message transported on a CAN bus.

We will now describe the known structure (CAN Bit Timing) defined in the CAN protocol of each bit included in a message transported on a CAN bus, with reference to FIG. 2.

The Nominal Time Bit (NTB) is defined by a structure composed of four separate segments 21 to 24. Each of these four segments is composed of an integer number of Time Quanta (TQ). The length of this time quantum TQ is defined started from the clock frequency $f_h$ of the device and a scalar BRP specific to the device, TQ=BRP/$f_h$. The total number of Time Quanta TQ in a bit must be between 8 and 25.

The first segment is a synchronization segment 21, the length of which is fixed at one time quantum TQ.

The second segment 22 is a propagation segment. Its function is to compensate for the physical delay induced by the CAN bus. Its length $L_{PRS}$ can be programmed to between one and eight time quanta TQ.

The third and fourth segments 23, 24 (phase segment 1 and phase segment 2) are phase segments used to position a sampling point. Their lengths $L_{PHS1}$ and $L_{PHS2}$ are also programmable.

Figure 3:
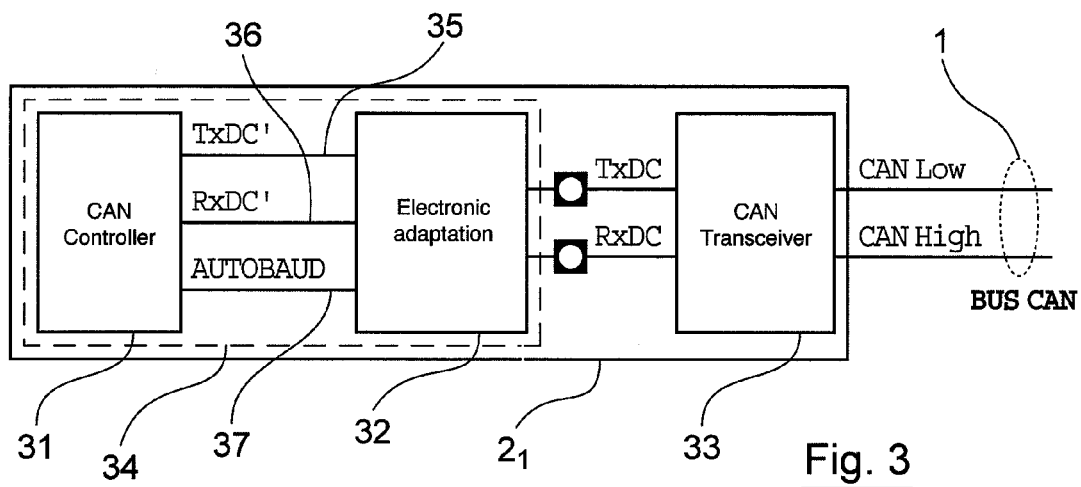
FIG. 3 shows a functional block diagram of an example embodiment of a device shown in FIG. 1 used to implement the method according to the invention.

We will now describe an example embodiment of a device shown in FIG. 1 (for example the device reference $2_1$) using the method according to the invention, with reference to FIG. 3.

Normally, the device $2_1$ comprises a classical CAN controller (or micro controller) 31 and a CAN transceiver circuit 33. This transceiver circuit 33 is specific to the physical layer of the CAN protocol and is designed to form an interface between the classical CAN controller 31 (that works at the logical level) and the CAN bus 1 (that works at the physical level). The classical CAN controller 31 emits a signal 35 (hereinafter called the send signal TxDC') and receives another signal 36 (called the reception signal RxDC').

According to this invention, the classical CAN controller 31 is modified in that:
it executes an automatic data rate detection and configuration algorithm (method according to the invention described in detail below with reference to FIG. 5);

it generates a mode selection signal 37 (Autobaud).

The device $2_1$ is also modified in that it also comprises an electronic adapter block 32, interfacing between the classical CAN controller 31 and the CAN transceiver circuit 33. The classical CAN controller 31 and the electronic adapter block 32 together form a completed CAN controller 44, specific to this invention. Thus, the electronic adapter block 32:

firstly, receives the send signal TxDC' and the mode selection signal 37 (Autobaud) sent by the classical CAN controller 3, and sends the reception signal RxDC' received by the classical CAN controller 3;

secondly, sends the send signal TxDC from the completed CAN controller 4, and receives the reception signal RxDC' from the completed CAN controller 4.

The electronic adapter block 32 is controlled by the mode selection signal 37 (Autobaud) such that during execution of the algorithm mentioned above, the device $2_1$ swaps over from one of the following modes to the other:

a normal mode in which the classical CAN controller 31 can send or receive messages on or from the CAN bus;

a listening mode in which the classical CAN controller 31 can receive messages from the CAN bus but cannot send messages on this CAN bus, and in which the classical CAN controller 31 can receive any messages that it sends to the CAN bus (and as mentioned above, are locked before they reach the bus).

Figure 4:
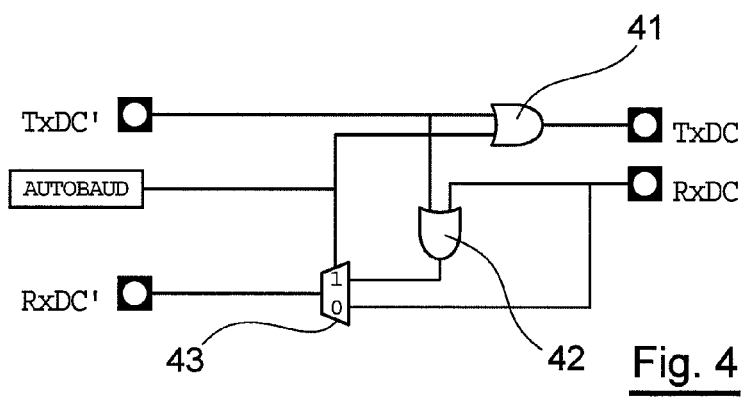
FIG. 4 shows a particular embodiment of the electronic adapter block shown in FIG. 3.

We will now describe a particular embodiment of the electronic adapter block 32 appearing in FIG. 3, with reference to FIG. 4.

It includes locking means for messages sent by the classical CAN controller 31 and means of looping the output onto the input of the classical CAN controller 31.

The mode selection signal 37 (Autobaud) will be equal to "0" if the device $2_1$ is required to operate in normal mode, or "1" for operation in listening mode.

The means of locking sent messages include an OR gate 41 performing the logical "OR" function between the mode selection signal 37 (Autobaud) and the send signal (TxDC') from the classical CAN controller 31. The output signal from the OR gate 41 forms the send signal (TxDC) of the completed CAN controller 34.

Thus, when the mode selection signal 37 (Autobaud) is equal to "0" (normal mode), the send signal (TxDC') of the classical CAN controller 31 is coincident with the send signal (TxDC) of the completed CAN controller 34, and therefore the device $2_1$ can send messages on the CAN bus.

On the other hand, when the mode selection signal 37 (Autobaud) is equal to "1" (listening mode), the send signal (TxDC) from the completed CAN controller 34 is still equal to "1" which corresponds to a rest state of the device (since "1" is the recessive state of the CAN bus) and therefore no message is sent by the device $2_1$ on the CAN bus.

The means of looping the output onto the input of the classical CAN controller 31 comprise:

an AND gate 42 performing the "AND" logical function between the send signal (TxDC') of the classical CAN controller 31 and the reception signal (TxDC) of the completed CAN controller 34;

a multiplexer 43 receiving the output signal from the AND gate 42 on a first input and the reception signal (RxDC) of the completed CAN controller 34 on a second input. The multiplexer output signal forms the reception signal (RxDC') of the classical CAN controller 31. The multiplexer is controlled by the mode selection signal 37 (Autobaud) such that the first input is selected if the mode selection signal is equal to "1", and the second input is selected if the mode selection signal is equal to "0".

Thus, when the mode selection signal 37 (Autobaud) is equal to the value "0" (normal mode), the reception signal (RxDC') of the classical CAN controller 31 is coincident with the reception signal (RxDC) of the completed CAN controller 34, and therefore the device $2_1$ only receives messages from the CAN bus.

On the other hand, when the mode selection signal 37 (Autobaud) is equal to "1" (listening mode), the reception signal (RxDC') of the classical CAN controller 31 is a combination (AND function) of the send signal (TxDC') of the classical CAN controller 31 and the reception signal (RxDC) of the completed CAN controller 34. Since "1" is the recessive state of the CAN bus, this means that messages from the CAN bus and messages (particularly error messages or acknowledgement messages) sent by the classical CAN controller 31 can be received.

Figure 5:
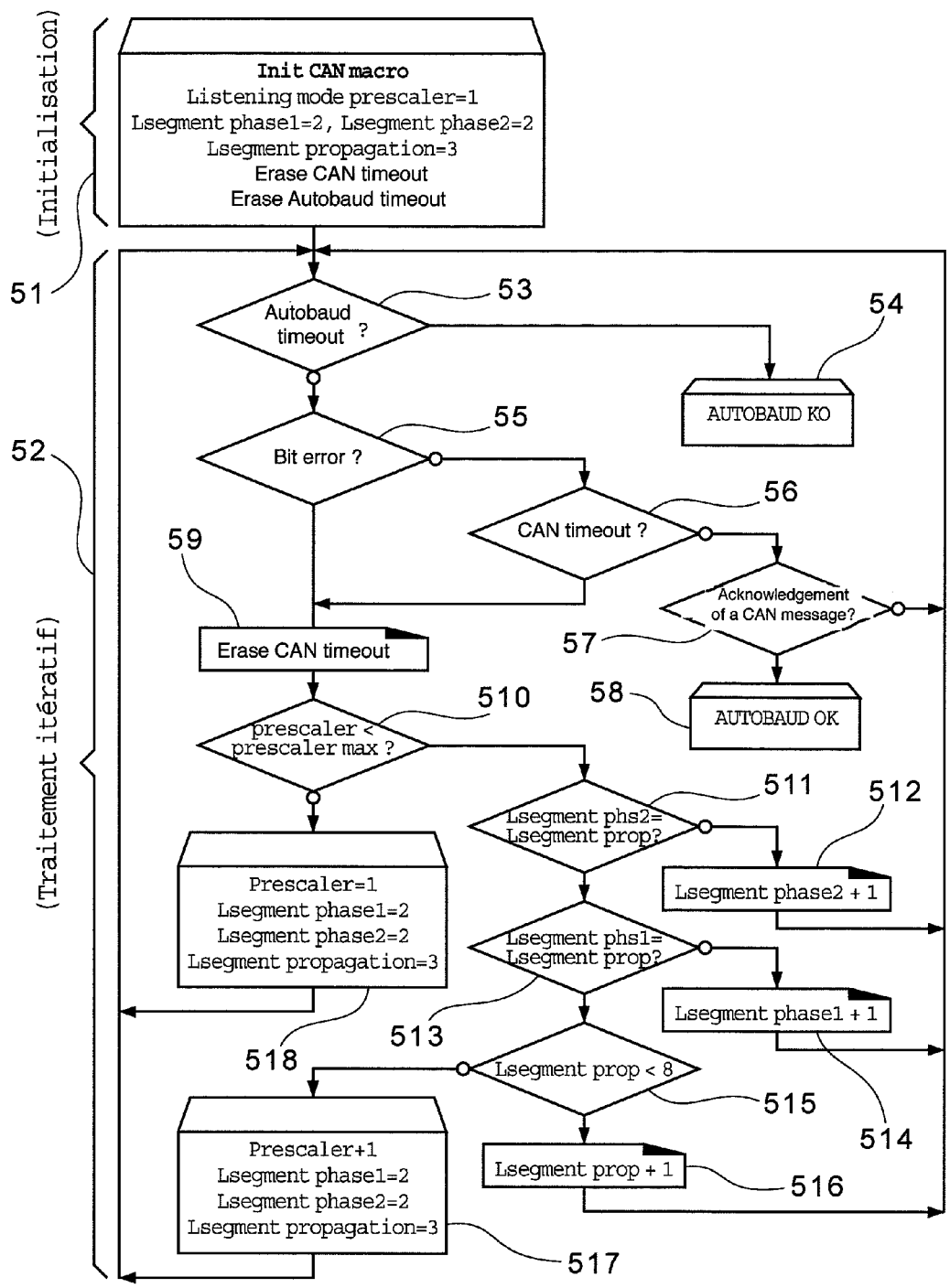
FIG. 5 shows a flowchart for a particular embodiment of the method according to the invention.

We will now present a particular embodiment of the method according to the invention for automatic data rate detection and configuration, with reference to the flowchart in FIG. 5.

A distinction is made between an initialisation phase 51 and an iterative processing phase 52.

Each data rate configuration is defined by values assigned to the following parameters (see description of FIG. 2 above):

the scalar BRP (denoted "prescaler" in FIG. 5);

the length $L_{PRS}$ of the propagation segment 22 (denoted "L propagation segment" in FIG. 5) expressed in time quanta TQ;

the lengths $L_{PHS1}$ and $L_{PHS2}$ of the first and second phase segments 23, 24 (denoted "L phase segment 1" and "L phase segment 2" respectively in FIG. 5) also expressed in time quanta TQ.

The initialisation phase 51 consists of:

placing the device in listening mode, by setting the value of the mode selection signal (Autobaud) to "1" (see discussion above);

initialising the device with an initial data rate configuration corresponding to a minimum data rate value. For example, this may be done by setting the initial value of the scalar BRP ("prescaler") to "1", the length $L_{PRS}$ ("L propagation segment") to "3", and the lengths $L_{PHS1}$ and $L_{PHS2}$ ("L phase segment 1" and "L phase segment 2") to "2";

starting (in other words cancelling) a first timeout (denoted "CAN timeout" in FIG. 5);

starting a second timeout (denoted "Autobaud timeout" in FIG. 5).

For example, the first and second timeouts can be managed by counters specific to the completed CAN controller 34.

The first timeout ("CAN timeout") is used to change the data rate configuration if the classical CAN controller 31 has sent neither a bit error message nor an acknowledgement message of a received message (and therefore has not received them since its input is looped onto its output).

The second timeout (Autobaud timeout) is used to stop execution of the procedure on a failure if no data rate configuration has been validated after a second predetermined time. This prevents an endless loop.

We will now describe details of the steps carried out in each iteration of the iterative processing phase 52.

During the step reference 53, it is detected whether or not the second timeout (Autobaud timeout) has elapsed. If it has, the procedure is stopped on a failure (autobaud KO) during the step reference 54.

Otherwise, step reference 55 is executed during which it is detected whether or not the classical CAN controller 31 has sent a bit error message. If it has not, it is detected if the second timeout (CAN timeout) has elapsed during the step reference 56.

If the first timeout (CAN timeout) has not elapsed, the step reference 57 is carried out during which it is detected if the classical CAN controller 31 has sent an acknowledgement message for a previously received message. If it has, then the procedure is stopped with a success result (Autobaud OK) during step reference 58, by validating the current data rate configuration and putting the device in normal mode. If the classical CAN controller 31 has not sent an acknowledgement message, the procedure returns to the step reference 53 (new iteration).

If the classical CAN controller 31 has sent a bit error message or if the first timeout (CAN timeout) has elapsed, then the next step reference 59 is carried out during which the first timeout (CAN timeout) is reinitialised. Then, during the step reference 510, it is detected if the scalar BRP (prescaler) is less than a predetermined maximum scalar (max prescaler). If it is not, step reference 511 is carried out during which it is detected if the current length of the second phase segment (L phase segment 2) is less than the current length of the propagation segment (L propagation segment). If the response to step reference 511 is negative, the current length in the second phase segment is incremented during step reference 512 and step reference 53 is started again (new iteration). If the response to step reference 511 is positive, step reference 513 is executed during which it is detected if the current length of the first phase segment (L phase segment 1) is less than the current length of the propagation segment (L propagation segment). If the response to step reference 513 is negative, the current length of the first phase segment is increased during step reference 514 and step reference 53 is repeated (new iteration). If the response to step reference 513 is positive, the next step 515 is executed during which it is detected if the current length of the propagation segment (L propagation segment) is less than eight (maximum value of this length). If the response to step reference 515 is positive, step reference 516 is executed during which the current length of the propagation segment is increased, and step reference 53 is then repeated (new iteration). If the response to step reference 515 is negative, then step reference 517 is executed during which the value of the scalar BRP (prescaler) is incremented and the lengths of the first and second phase segments ("L phase segment 1" and "L phase segment 2") and the length of the propagation segment (L propagation segment) are reset to their initial values ("2", "2" and "3" respectively), and then step reference 53 is repeated (new iteration).

If it is detected that the scalar BRP (prescaler) is not less than the maximum scalar (max prescaler) in step reference 510, step reference 518 is executed in which all parameters (scalar BRP (prescaler), first and second phase segment lengths ("L phase segment 1" and "L phase segment 2") and the length of the propagation segment (L propagation segment) are reset to their initial values, and step reference 53 is then repeated (new iteration).

It will be noted that the loops to increment the length of the propagation segment and the lengths of the first and second phase segments are such that these three lengths are incremented homogeneously.

The method according to the invention for automatic detection and configuration of data rate can be carried by software or hardware.

The invention claimed is:

1. A method for automatic detection of a network data rate and for configuration at the detected data rate by a device connected to the network, the method comprising:
 operating the device in an initialization phase, the initialization phase comprising:
  putting the device into a listening mode, in which the device receives messages from the network but does not send messages on the network;
  initializing the device with an initial data rate configuration; and
  starting a first timeout; and
 operating the device in an iterative processing phase after the initialization phase, the iterative processing phase comprising the following steps for each iteration:
  if at least one data rate adaptation condition is satisfied, interrupting the iterative processing phase, validating the current data rate configuration and putting the device into a normal mode; and
  if at least one data rate non-adaptation condition is satisfied or if the first timeout elapses without a data rate adaptation condition or a data rate non-adaptation condition being satisfied, restarting the first timeout and replacing the current data rate configuration by a new data rate configuration obtained by using a mechanism for obtaining several possible data rate configurations without knowledge of a clock frequency $f_h$ of the device and without any assumption about the network data rate.

2. The method according to claim 1, wherein said at least one data rate non-adaptation condition is detection by the device of an error called a bit error on at least one bit of a message received by the device.

3. The method according to claim 1, wherein said at least one data rate adaptation condition is acknowledgement of a received message by the device.

4. The method according to claim 1, wherein said mechanism is used to obtain all possible data rate configurations of the device one after the other.

5. The method according to claim 1, wherein the initialization phase further comprises starting a second timeout, and wherein the iterative processing phase further comprises interrupting each iteration if the second timeout expires without a current data rate configuration being validated.

6. The method according to claim 1, wherein the network is a CAN bus and the device comprises a completed CAN controller that is an extension of a classical CAN controller so that the method for automatic detection of the network data rate and for configuration to the detected data rate is implemented.

7. The method according to claim 6, wherein a first message of the messages includes bits, and wherein each of the bits included in the first message has a nominal time, defined by the following parameters:
 a scalar BRP, such that $TQ=BRP/f_h$, where TQ is a time quantum and $f_h$ is the clock frequency of the device;
 the length $L_{PRS}$ of a propagation segment designed to compensate for the physical delay on the CAN bus, expressed as a number of time quanta TQ; and
 the lengths $L_{PHS1}$ and $L_{PHS2}$ expressed as a number of time quanta TQ, of first and second phase segments used to position a sampling point; wherein said mechanism advantageously determines values for the scalar BRP and the lengths $L_{PRS}$, $L_{PHS1}$ and $L_{PHS2}$, for each of the several possible data rate configurations, without knowing the clock frequency $f_h$ of the device and without any assumption about the network data rate.

8. The method according to claim 7, wherein said mechanism uses a first increment loop of length $L_{PHS2}$, the first increment loop included in a second increment loop of length $L_{PHS1}$, the second increment loop included in a third increment loop of length $L_{PRS}$, the third increment loop included in a fourth increment loop of scalar BRP, and wherein the first, second, and third increment loops for lengths $L_{PRS}$, $L_{PHS1}$ and $L_{PHS2}$ are such that the lengths $L_{PRS}$, $L_{PHS1}$ and $L_{PHS2}$ are incremented uniformly.

9. A device designed to be connected to a network, wherein the device comprises means for automatic detection of the network data rate and for configuration to the detected data rate, the means for automatic detection comprising:
   initialization means comprising:
      means of changing over from a normal mode to a listening mode, in which a locking means for blocking messages sent by the device to the network is activated, and in which the device continues to receive messages from the network;
      means of initializing the device with an initial data rate configuration; and
      means of starting a first timeout; and
   iterative processing means comprising:
      first means of detection, for detecting that at least one data rate adaptation condition is satisfied, and if satisfied, for activating: means of interrupting the iterative processing, means of validating a current data rate configuration and means of changing over from listening mode to normal mode; and
      second means of detection, for detecting that at least one data rate non-adaptation condition is satisfied or that the first timeout has expired without a data rate adaptation or non-adaptation condition having been satisfied, and if satisfied, for activating: means of reinitializing the first timeout and means of replacing the current data rate configuration by a new data rate configuration obtained by using a mechanism for obtaining several possible data rate configurations without knowing a clock frequency $f_h$ of the device and without any assumption about the network data rate, wherein the first means and the second means are activated during each iteration.

10. The device according to claim 9, wherein said at least one data rate non-adaptation condition is when the device detects an error, called a bit error, on at least one bit of a message received by the device.

11. The device according to claim 9, wherein said at least one data rate adaptation condition is when the device acknowledges a received message.

12. The device according to claim 9, wherein said mechanism can be used to obtain all possible data rate configurations of the device one after the other.

13. The device according to claim 9, wherein the initialization means also include means of starting a second timeout, and wherein the iterative processing means also comprises third detection means activated during each iteration to detect if the second timeout expires without the current data rate configuration having been validated, and if so, means of interrupting the method being activated.

14. The device according to claim 9, wherein the network is a CAN bus and the device comprises a completed CAN controller, the completed CAN controller comprising said means for automatic detection of the network data rate and for configuration to the detected data rate.

15. The device according to claim 14, wherein a message comprises bits, each of the bits comprising a nominal time defined by the following parameters:
   a scalar BRP, such that $TQ=BRP/f_h$, where TQ is a time quantum and $f_h$ is the clock frequency of the device;
   the length $L_{PRS}$ expressed as a number of time quanta TQ, of a propagation segment designed to compensate for the physical delay on the CAN bus; and
   the lengths $L_{PHS1}$ and $L_{PHS2}$ expressed as a number of time quanta TQ, of first and second phase segments used to position a sampling point; wherein said mechanism advantageously determines values for the scalar BRP and the lengths $L_{PRS}$, $L_{PHS1}$ and $L_{PHS2}$, for each of the several possible data rate configurations, without knowing the clock frequency $f_h$ of the device and without any assumption about the network data rate.

16. The device according to claim 15, wherein said mechanism uses a first increment loop of length $L_{PHS2}$, the first increment loop included in a second increment loop of length $L_{PHS1}$, the second increment loop included in a third increment loop of length $L_{PRS}$, the third increment loop included in a fourth increment loop of scalar BRP, and wherein the first, second, and third increment loops for lengths $L_{PRS}$, $L_{PHS1}$ and $L_{PHS2}$ are such that the lengths $L_{PRS}$, $L_{PHS1}$ and $L_{PHS2}$ are incremented uniformly.

17. The device according to claim 14, wherein the means of changing over from normal mode to listening mode comprises means of generating a mode selection signal, equal to the value "0" or "1" depending on whether the device is to operate in normal mode or listening mode, respectively, and wherein the completed CAN controller comprises a classical CAN controller modified so that the classical CAN controller includes said means for automatic detection of the network data rate and for configuration to the detected data rate, apart from said means of blocking the sent messages, and wherein the means of blocking the sent messages include means of performing the "OR" logical function between the mode selection signal and the send signal of the classical CAN controller, the output signal from the means of performing the "OR" logical function being used as the send signal of the completed CAN controller.

18. The device according to claim 17, wherein the completed CAN controller also includes means of looping the output back onto the input of the classical CAN controller, comprising:
   means of performing the "AND" logical function between the send signal of the classical CAN controller and the reception signal of the completed CAN controller; and
   multiplexing means receiving the output signal from the means of performing the "AND" logical function on a first input, and the reception signal from the completed CAN controller on the second input, the output signal from the multiplexing means including the reception signal of the classical CAN controller, the multiplexing means being controlled by the mode selection signal such that the first or second input is selected depending on whether the mode selection signal is equal to the value "1" or "0" respectively.

* * * * *